Sept. 30, 1969      J. H. STEWARD      3,469,613

NUT-PANEL ASSEMBLY AND METHOD OF MAKING SAME

Filed Dec. 19, 1967      2 Sheets-Sheet 1

INVENTOR.
JERRY H. STEWARD.
BY
WILSON, SETTLE & BATCHELDER.
ATT'YS.

Sept. 30, 1969   J. H. STEWARD   3,469,613
NUT-PANEL ASSEMBLY AND METHOD OF MAKING SAME
Filed Dec. 19, 1967   2 Sheets-Sheet 2
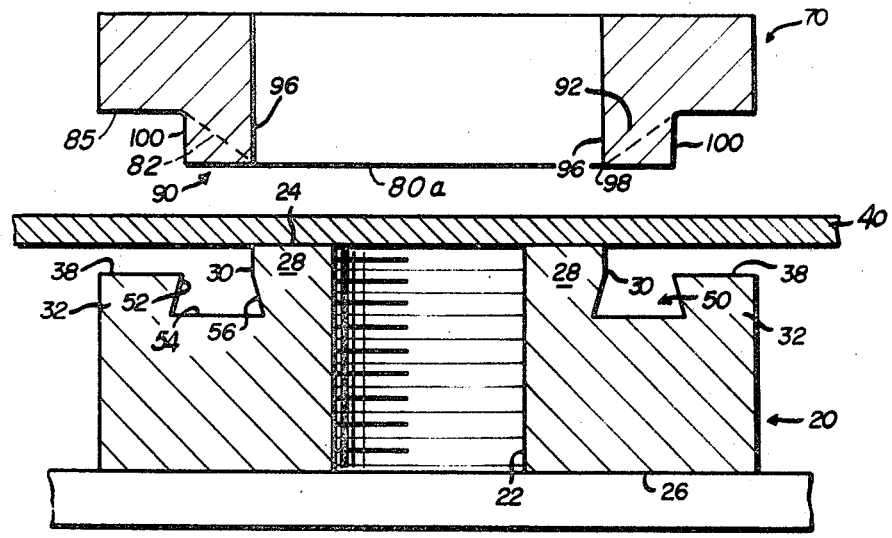
FIG. 5
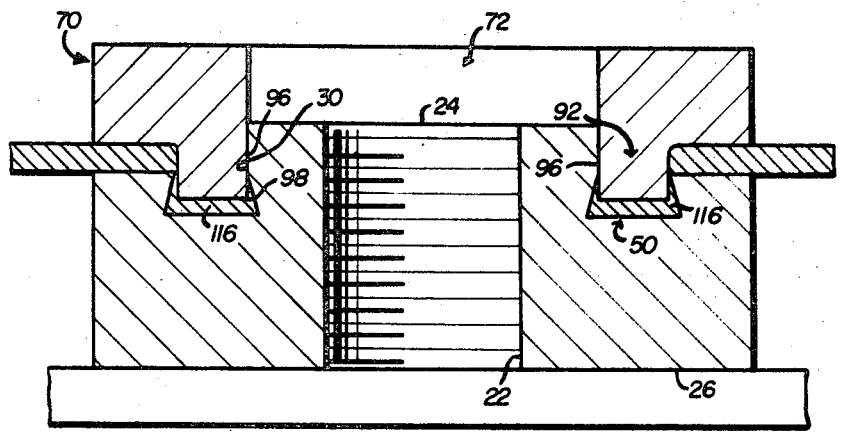
FIG. 6
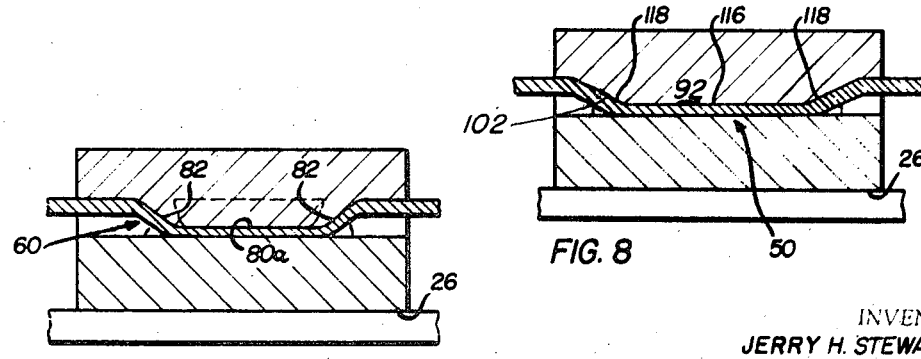
FIG. 7
FIG. 8
INVENTOR.
JERRY H. STEWARD.
BY
WILSON, SETTLE & BATCHELDER.
ATT'YS.

United States Patent Office 3,469,613
Patented Sept. 30, 1969

3,469,613
NUT-PANEL ASSEMBLY AND METHOD
OF MAKING SAME
Jerry H. Steward, Bloomfield Hills, Mich., assignor to Multifastener Corporation, Detroit, Mich., a corporation of Michigan
Filed Dec. 19, 1967, Ser. No. 691,899
Int. Cl. F16b 39/34; B23p 11/00
U.S. Cl. 151—41.73                              1 Claim

ABSTRACT OF THE DISCLOSURE

A nut and panel assembly in which all of the deformation of the panel to secure the panel to the nut is within the confines of the nut. The nut includes a central portion having outwardly directed flanges forming a nut body portion having an upper surface spaced below the free end of the pilot portion. The surfaces of two of the opposed flanges have undercut grooves formed therein adjacent the pilot portion, while the surfaces of another pair of opposed flanges have a rectangular groove with all of the grooves receiving deformed portions of the panel.

Background of the invention

The present invention relates generally to a nut-panel assembly and, more particularly, to an improved method of securing a nut to a sheet metal panel and to a nut and panel assembly having improved retention characteristics.

In the manufacture of products, such as automobiles and the like, from sheet metal panels, it is often necessary to attach adjacent panels to one another or to attach brackets or other devices to the panels. In many such instances, it has become customary in the automobile industry to utilize what is commonly referred to as a "pierce nut" of the type disclosed and claimed in Patent No. 3,152,628. In this type of nut, the nut is assembled on the panel in a single uninterrupted motion in which the nut pierces the panel, and thereafter the panel is deformed in grooves disposed on opposite sides of a pilot portion of the nut to affix and seal the nut to the panel.

Another type of pierce nut which has found remarkable success is disclosed in Patent No. 3,315,345. This pierce nut is especially adapted for providing a flush relationship between one surface of the panel and the pilot end of the nut. This is accomplished by providing undercut grooves in flange surfaces located on opposite sides of the pilot portion which receives a deformed portion on the panel during the assembly.

However, with the recent emphasis on safety in the automotive industry, auto manufacturers are requiring installations of the above mentioned type to be capable of resisting shear forces applied in any direction on a bolt or fastener received in the threaded opening of the above mentioned nuts.

Thus, recent tests have shown that it would be desirable to provide additional retention capability when a force is applied substantially parallel to or at less than 90° to the surface of the panel and in a direction extending longitudinally of the grooves, the nut may be displaced relative to the panel.

Also, in some installations it has been found necessary to resist extremely high torque forces when a fastener is installed in the threaded aperture of a nut-panel assembly.

Summary of the invention

Applicant has found that the retention capabilities and the resistance to torque of the nut-panel assembly disclosed in the above mentioned Patent No. 3,315,345 can be greatly increased by providing a second pair of flanges disposed on the remaining two sides of the pilot portion of the nut which extends outwardly therefrom and also providing rectangular openings in the flange surfaces adjacent the sides of the pilot portion. These rectangular openings receive a portion of the panel while the nut is being assembled thereon to thereby increase the ability of the nut and panel assembly to resist shear forces applied in any direction.

Accordingly, the primary object of the present invention is to provide an improved method of making a nut-panel assembly of increased resistance to any forces normally encountered by the assembly.

Another object is to provide an improved nut-panel assembly of increased retention capability when shear or torque forces are applied to the assembly.

A further object is to provide a method for assembling a pierce nut and a panel by displacing all of the edges of the opening or aperture defined in the panel by piercing with the nut into grooves surrounding the pilot or piercing portion of the nut.

Other objects of this invention will appear in the following description and appended claim, reference being had to the accompanying drawings forming a part of this specification wherein like reference characters designate corresponding parts in the several views.

On the drawings:

FIGURE 5 is a sectional view similar to FIGURE 3 showing a sectional view of the nut taken along lines 5—5 of FIGURE 1;

FIGURE 6 is a sectional view taken along lines 6—6 of FIGURE 2 showing the nut, panel and die button after formation of the nut-panel assembly;

FIGURE 7 is a sectional view taken along 7—7 of FIGURE 2; and

FIGURE 8 is a sectional view taken along 8—8 of FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
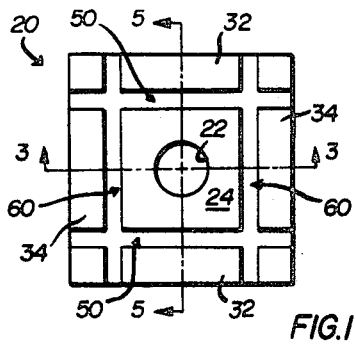
FIGURE 1 is a plan view of an improved nut to be affixed to a panel.
Figure 3:
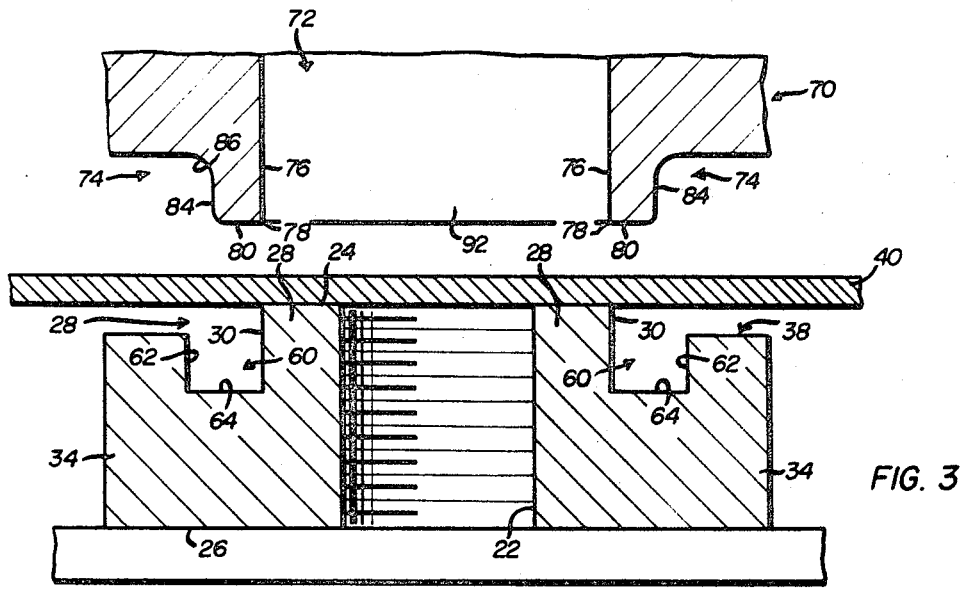
FIGURE 3 is an enlarged vertical sectional view of the nut taken generally along lines 3—3 of FIGURE 1 and showing a nut with a panel and die button prior to assembly of the nut and the panel.

As best illustrated in FIGURES 1, 3 and 5, the improved nut 20 is provided with a central threaded aperture 22 opening on opposed end faces 24 and 26 of the nut. The end face 24 of the nut is defined by a centrally located nut pilot portion 28 having opposed pairs of vertically extending side walls 30 blending into the end face of the nut pilot through right angular piercing corners.

The nut has a body portion defined by two pairs of opposed flanges 32 and 34 respectively extending outwardly from the opposed sides forming the central pilot portion 28. As clearly shown in FIGURES 3 and 5, the upper surfaces of the flanges 32 and 34 define a substantially continuous face or surface 38 spaced below the face of the end pilot by a distance related to the thickness of the panel 40 to which the nut is to be secured. For example, for use in panels 40 of from 0.025 to 0.075 inch in thickness, a nut having a pilot dimension of 0.025 may be used.

As shown in FIGURE 5, the upper surfaces of the flanges 32 each have a re-entrant groove 50 defined between the side wall 30 of the nut and the end of the flange. Each re-entrant groove is defined by a bottom wall 54 intermediate upwardly and inwardly tapered groove side walls 52 and 56. The upper ends of the inclined walls 52, 56 provide a re-entrant opening or restricted entrance mouth defined between the nut pilot side 30 and the flange surface 38.

The second pair of flanges 34 likewise have grooves 60 defined in the flanges adjacent the side walls forming the nut pilot portion. As clearly shown in FIGURES 3 and 4, each of the grooves 60 includes a side wall 62 which is spaced from and parallel to the side wall 30 forming the end pilot portion and a planar bottom wall 64.

Figure 2:
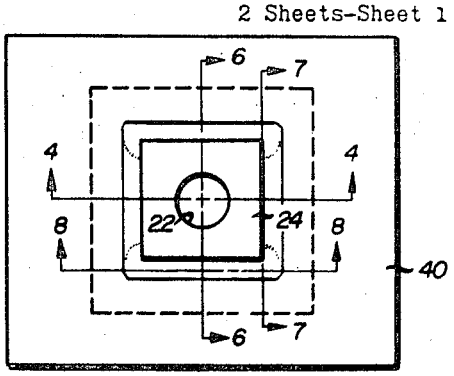
FIGURE 2 is a plan view of the completed nut-panel assembly of the invention.
Figure 4:
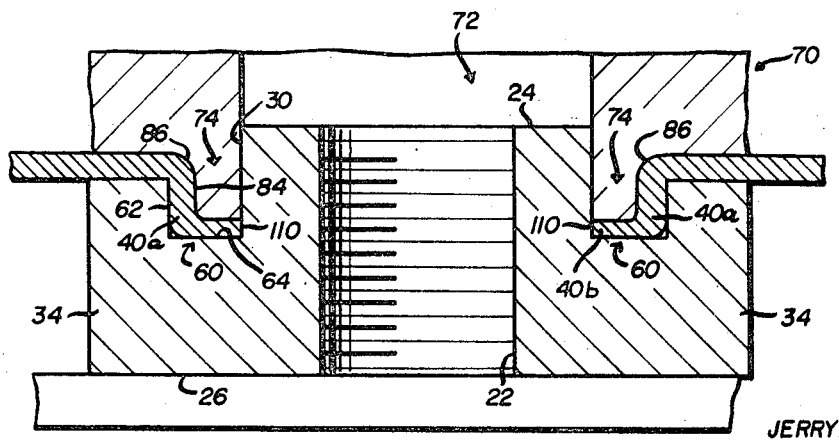
FIGURE 4 is a view similar to FIGURE 3 illustrating the die button, panel and nut in position following forming of the nut-panel assembly.

The method of forming the nut and panel assembly illustrated in FIGURE 2 can readily be appreciated from a comparison of FIGURES 3 and 5 with FIGURES 4 and 6. In these figures, a die button 70 has a central aperture 72 which corresponds in shape and size to the nut pilot portion.

The lower end or planar surface of the die button includes a first pair of spaced depending embossments or projections 74 having inner walls 76 which are continuations of the walls defining the opening 72. The walls 76 terminate in shearing edges 78 which cooperate with the upper edges of the pilot portion sides 30 to pierce the panel along the entire length of the sides 30. Each projection 74 has a lower wall or surface 80 extending outwardly from the piercing corners or edges 78 and disposed perpendicular to the inner walls 76. As shown in FIGURE 7, a major portion of the wall 80 has a surface 80a which is spaced below and parallel to planar lower surface 85 of the die button and merges with the planar lower surface 85 of the die button 70 along flat merging surfaces 82.

The walls 80 merge with vertical outer walls 84 through radiused corners. Also, the upper ends of the substantially vertical walls 84 have radiused corners 86 to merge with the lower end or surface of the die button 70.

The lower end of the die button 70 further includes a second pair of spaced elongated embossments or projections, generally indicated at 90. These embossments 90, as best illustrated in FIGURES 5, 6 and 8, each include a pair of longitudinally spaced piercing projections 92 which are generally rectangular in cross section. It will be seen from FIGURE 6, that the projections 92 include parallel inner side surfaces 96 which are an extension of the side walls of the opening 72 and are vertically aligned with the corresponding nut pilot portion side 30. The lower edges or ends of the surfaces 96 define sharp shearing edges or corners 98 which cooperate with the upper edges of the sides 30 of the nut pilot portion to pierce the panel, in a manner to be described later. The lower surface of the embossments 92 conform to the configuration of the lower surface of the embossments 74 and include inclined end portions 102.

The distance between the inner and outer parallel surfaces 96 and 100 is equal to the width of the restricted opening 50 at the surface 38 of the nut.

In assembling the nut and the panel, the nut may be supported on a fixed surface with the panel 40 superimposed thereon and the die button thereafter displaced vertically relative to the nut and the panel. Of course, it will be readily understood to those skilled in the art that the die button may be fixed and the nut displaced relative to the fixed die button, as by a press punch or the like. Additionally, the panel may well contact the die button rather than the nut prior to assembly or the panel may be held in a fixed position and the nut and die button moved towards each other.

In any event, the nut is moved relative to the die button with the panel interposed therebetween so that the nut and the die button cooperate to substantially simultaneously pierce the nut pilot portion 28 through the panel 40 and deform a portion of the panel defined adjacent the edges of the aperture which is formed in the panel by the nut pilot portion. Of course, the piercing of the panel results from the cooperation between the piercing edges or corners 78 and 98 and the upper edges of the nut pilot portion 28.

Considering first the action of the embossments or projections 74, continued movement of the nut relative to the die button will cause the sheared edges 110 of the panel to be deformed or displaced downwardly into the grooves 60. During this downward movement, the radiused corners 86 and vertical outer walls 84 of each projection will cooperate with the side walls 62 of the grooves 60 to deform the portion 40a of the panel to the position shown in FIGURE 4. Stated another way, the deformed portion 40a of the panel will be in contact with the major portion of the walls 62 of the groove 60 and will be connected to the main portion of the panel along the entire length of the groove while the portion 40b will bottom on lower wall 64 and substantially completely fill the lower portion of the rectangular groove 60. This will provide a substantial amount of panel metal adjacent the side wall 62 which is capable of opposing any torque applied to the nut, as by installing a threaded fastener into the nut aperture 22.

Stated another way, deformed portions 40a adjacent the edges 110 of the aperture formed in the panel will provide increased resistance of the assembly to turning movement of the nut during assembly as well as providing an increased resistance to shear forces applied longitudinally of the re-entrant grooves 60.

The action of the second pair of opposed projections 90 will be similar to the projections but will produce additional securing between the nut and panel. Thus, the continued movement of the nut relative to the die button after the shearing of the panel between the shearing edges 98 and the upper edges of the pilot, will completely sever localized portions 116 of the panel 40 along lines 116a which are parallel to and adjacent the edges of the opening and substantially along the juncture between the surface 38 and the inclined wall 52 and deflect these portions downwardly into the wider groove portion defined between the inclined side walls 52, 56 and the bottom wall 54. Of course, the panel metal on the opposite ends of the severed portions 116 underlying the surfaces 102 of projections 92 is not severed completely from the remainder of the panel and serves to join the severed portions with the remainder of the panel.

Thus, in the improved nut-panel assembly shown in FIGURE 6, the severed portions 116 are displaced into the re-entrant nut grooves and deformed therein to completely fill the lower re-entrant portions of the groove and the connecting portions 118 join the severed portions with the remaining main portion of the panel.

The improved nut-panel assembly not only is capable of resisting increased torque applied by a fastener but the flanges extending outwardly from the respective sides of the nut pilot portion will allow the assembly to resist increased "pull out" forces which may be encountered, as when an automobile is involved in an accident.

While a preferred embodiment has been shown and described, it is to be understood that various modifications will occur to those skilled in the art.

I claim:
1. A nut-panel assembly comprising a panel and a rectangular nut having
  (1) first and second pairs of opposed sides defining a pilot portion projecting through a panel aperture having an equal number of edges,
  (2) lateral shoulders extending outwardly from each of the sides of the pilot portion adjacent one end thereof and defining a substantially continuous surface against which is bottomed a main portion of the panel spaced from the panel aperture,

(3) means defining a first pair of grooves in said surface adjacent opposed sides of the pilot portion, said first pair of grooves having upwardly and inwardly inclined side walls terminating at said surface to define restricted openings at said surface, and (4) means defining a second pair of grooves in said surface adjacent said second pair of opposed sides of said pilot portion, said second pair of grooves having planar parallel side walls to define rectangular grooves and of sufficient length to interconnect adjacent ends of said first pair of grooves, (5) said panel having portions intermediate the edges defining said opening and the main portion of the panel which are (a) severed along lines parallel to and adjacent the edges of the openings and substantially along the juncture between said surface and, said side walls of said restricted openings at said surface (b) displaced in each of the respective grooves at least the lenth of said pilot edges, (c) deformed to engage substantially the entire inclined walls of said first pair of grooves, and (d) joined at opposite ends with the main panel portion bottomed on said shoulders, said displaced portions of the panel which are received in said restricted opening grooves being trapped within the grooves below said surface.

(6) said panel having further portions received in said rectangular grooves and continuously connected to said main portion of the panel.

References Cited

UNITED STATES PATENTS

| 3,253,631 | 5/1966 | Reussen | 151—41.73 |
| 3,314,138 | 4/1967 | Double | 29—520 |
| 3,315,345 | 4/1967 | Double et al. | 151—41.73 |

EDWARD C. ALLEN, Primary Examiner

U.S. Cl. X.R.

29—432, 522